United States Patent [19]

van der Lely

[11] 4,412,587
[45] Nov. 1, 1983

[54] SOIL WORKING MACHINE

[76] Inventor: Cornelis van der Lely, 7, Brüschenrain, Zug, Switzerland

[21] Appl. No.: 320,530

[22] Filed: Nov. 12, 1981

Related U.S. Application Data

[63] Continuation of Ser. No. 27,365, Apr. 5, 1979, abandoned.

[30] Foreign Application Priority Data

| Apr. 12, 1978 [NL] | Netherlands | 7803852 |
| Apr. 12, 1978 [NL] | Netherlands | 7803853 |
| Apr. 12, 1978 [NL] | Netherlands | 7803854 |
| Apr. 12, 1978 [NL] | Netherlands | 7803855 |

[51] Int. Cl.³ .............................................. A01B 9/00
[52] U.S. Cl. .................................... 172/39; 172/49; 172/66; 172/123; 172/547; 172/556
[58] Field of Search ............... 172/39, 556, 555, 547, 172/49, 56, 35, 52, 66, 123

[56] References Cited

U.S. PATENT DOCUMENTS

| 514,066 | 2/1894 | Drader | 172/547 |
| 2,559,996 | 7/1951 | Pettman | 172/556 |
| 2,590,790 | 3/1952 | Pettman | 172/556 |
| 3,297,095 | 1/1967 | Lely | 172/39 |
| 3,941,193 | 3/1976 | Shoemaker | 172/547 X |

FOREIGN PATENT DOCUMENTS

| 1007824 | 2/1952 | France | 172/39 |
| 265783 | 2/1927 | United Kingdom | 172/39 |

*Primary Examiner*—Paul E. Shapiro
*Attorney, Agent, or Firm*—Penrose, Lucas, Albright, Mason, Mason & Albright

[57] ABSTRACT

A soil working machine has a working member with element blades and a scraping member that releases clods cut out by the working member so that the clods drop to the ground. Both of the members can be positively driven in the same direction about horizontal axes, but the scraping member can also be rotated by contact with the ground. Preferably, the blades are secured to support discs and extend axially of the working member. Scraping elements on arms of the scraping member project between the blades of adjacent support discs and have vanes which also extend almost axially. During rotation, the vanes are moved to intersect the paths of the blades and to remove the clods. Other forms of scraping members are described. The scraping member ensures that soil is wiped from the blades, to avoiding clogging of the working member and a consequent increased power requirement. Also, the cut clods are preferably replaced upside down by the action of the members.

2 Claims, 11 Drawing Figures

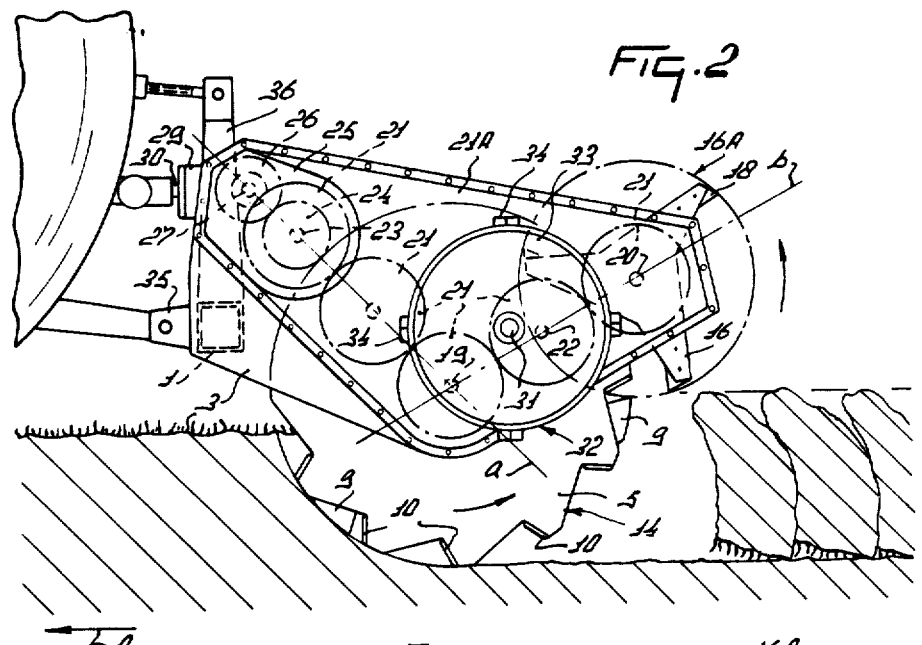
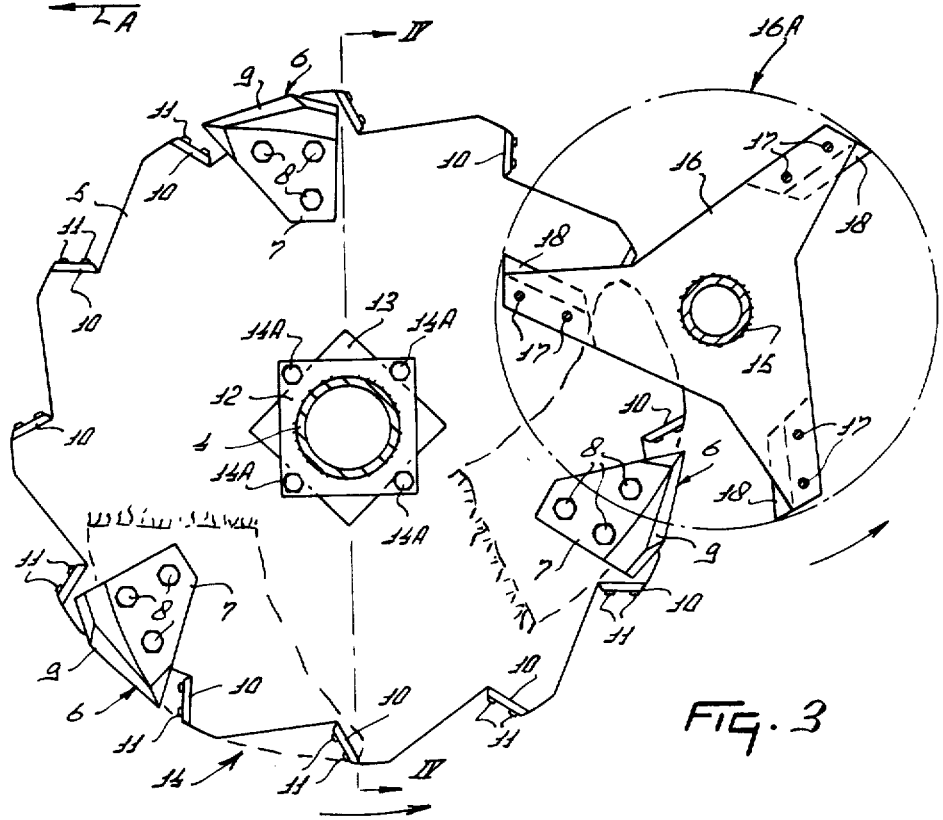

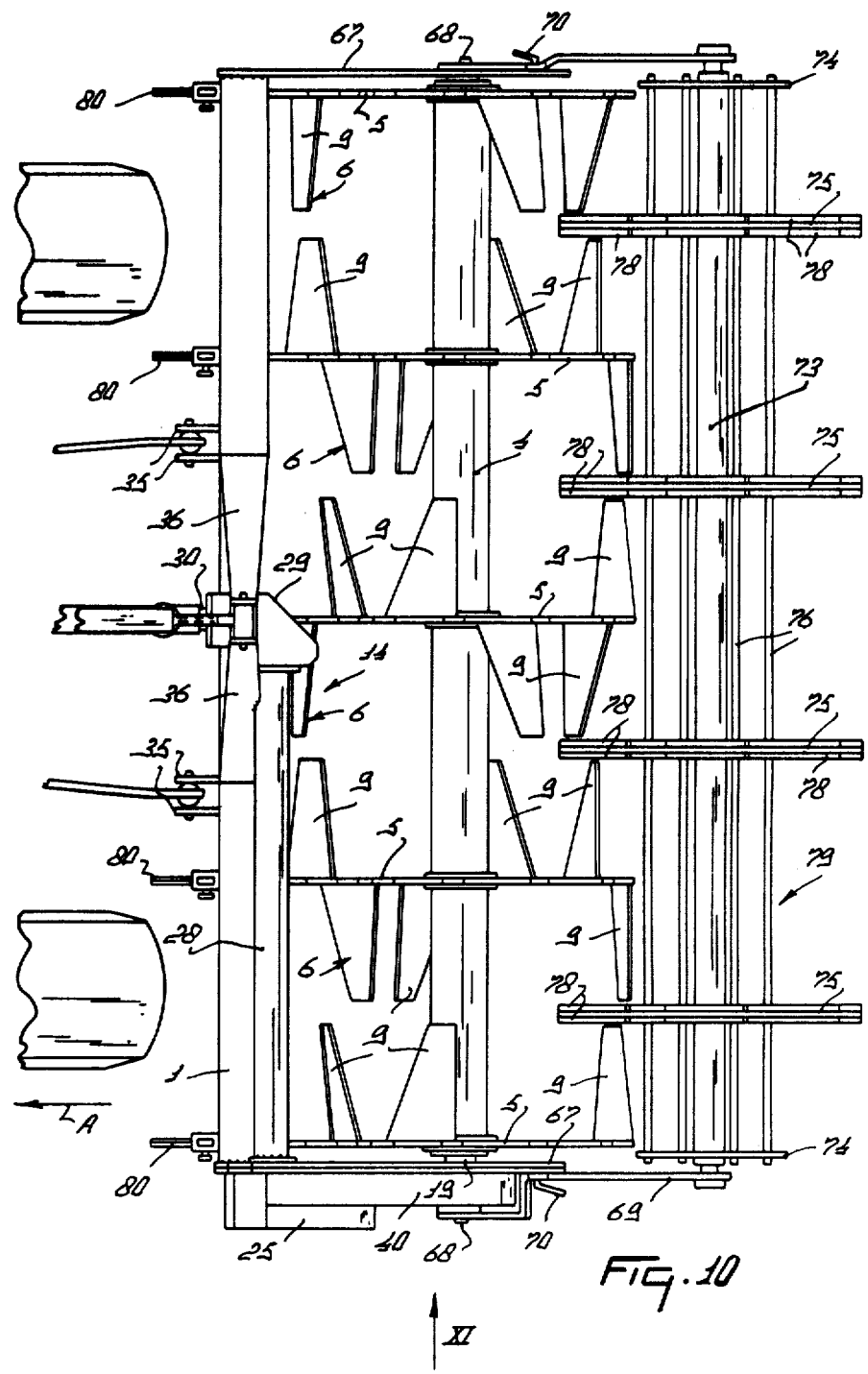

SOIL WORKING MACHINE

CROSS REFERENCE TO RELATED APPLICATION

This application is a continuation of application Ser. No. 027,365 filed Apr. 5, 1979, now abandoned.

SUMMARY OF THE INVENTION

With known soil working machines it is possible that, under unfavorable conditions such as with heavy, wet soil, soil may stick to the working member and impair its function, as well as resulting in a greater power requirement.

According to a first aspect of the present invention there is provided a soil working machine comprising a positively driven working member and a further member, both members being rotatable about substantially parallel rotary axes and being provided with elongate elements which extend axially or approximately axially, the elements of the members moving across one another in the region of nearest approach of the elements during rotation of the members.

According to a second aspect of the present invention there is provided a soil working machine comprising a positively driven working member which co-operates with a further member which rotates, in operation, by contact with the ground, part of the further member moving along a path located at least partly inside the path described by the trailing edges of working elements connected to the positively driven member.

According to a third aspect of the present invention there is provided a soil working machine comprising a positively driven working member provided with working elements which extend transversely of the intended direction of operative travel of the machine, there being provided, behind the working member and adjacent the path described in operation by the working elements, a roller which is provided with elongate elements extending lengthwise of the roller.

According to a fourth aspect of the present invention there is provided a soil working machine comprising a drivable working member which is provided with a working element arranged on a support, the diameter of the support being substantially equal to the diameter of the path described by the working element.

According to a fifth aspect of the present invention, there is provided a soil working machine comprising a drivable working member which comprises a cutter which is located in front of a working element with respect to the direction of operative rotation of the working member, the working width of the working element being broader than that of the cutter.

According to a sixth aspect of the present invention, there is provided a soil working machine comprising a working member adapted to be driven about a non-vertical axis and comprising at least one working element by which, during operation, earth is displaceable to the rear, a retainer being provided near the rotary axis of the working member for opposing displacement of a portion of the earth transported by the working element.

For a better understanding of the present invention and to show how it may be carried into effect, reference will now be made, by way of example only, to the accompanying drawings, in which:

BRIEF DESCRIPTION OF THE DRAWINGS

FIG. 2 is a side view taken in the direction of the arrow II in FIG. 1;
FIG. 3 is an enlarged sectional view taken on the line III—III in FIG. 1;
FIG. 10 is a plan view of a fourth embodiment of a soil cultivating machine.

DESCRIPTION OF THE PREFERRED EMBODIMENTS

Figure 1:
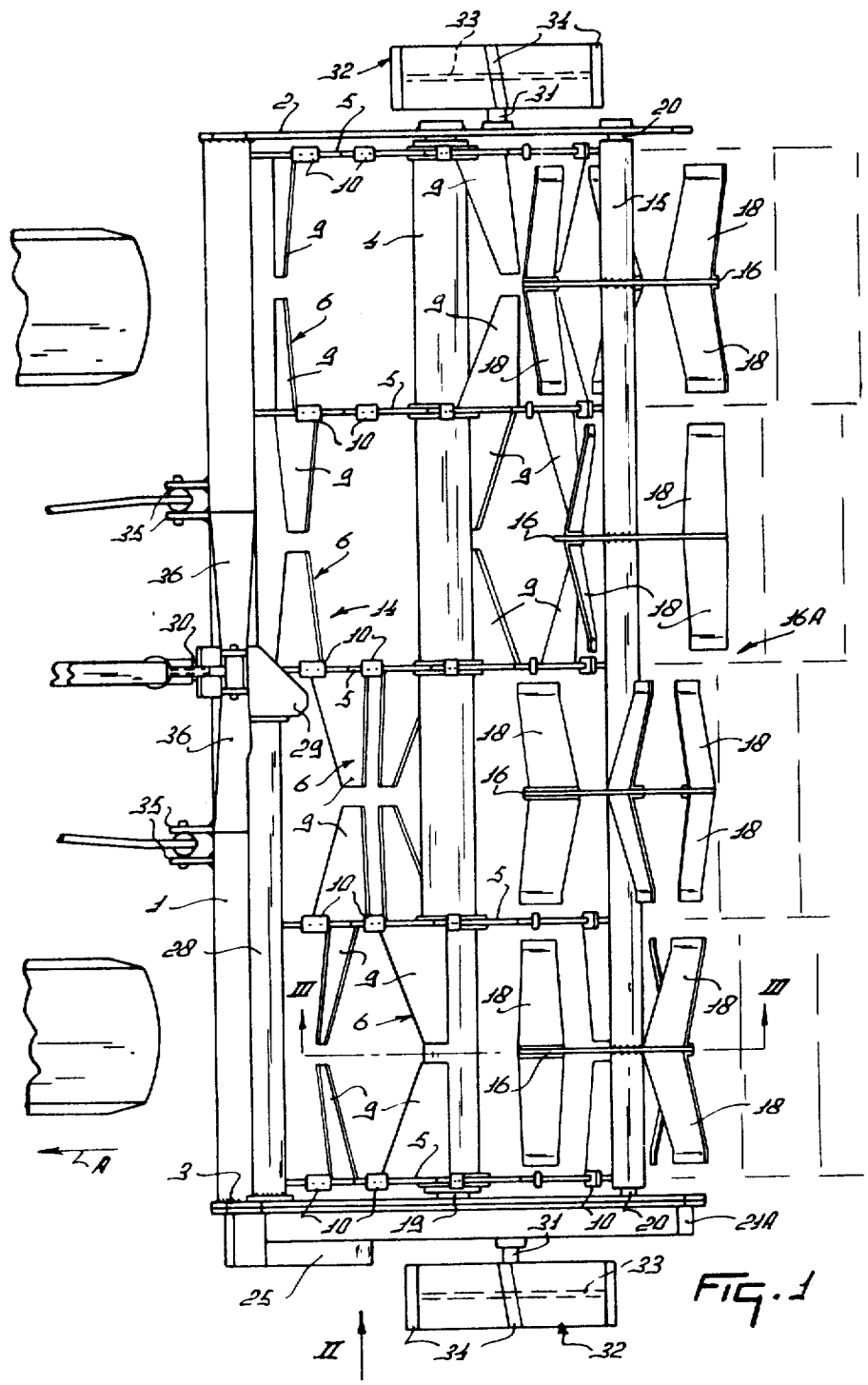
FIG. 1 is a plan view of a soil working machine.
Figure 4:
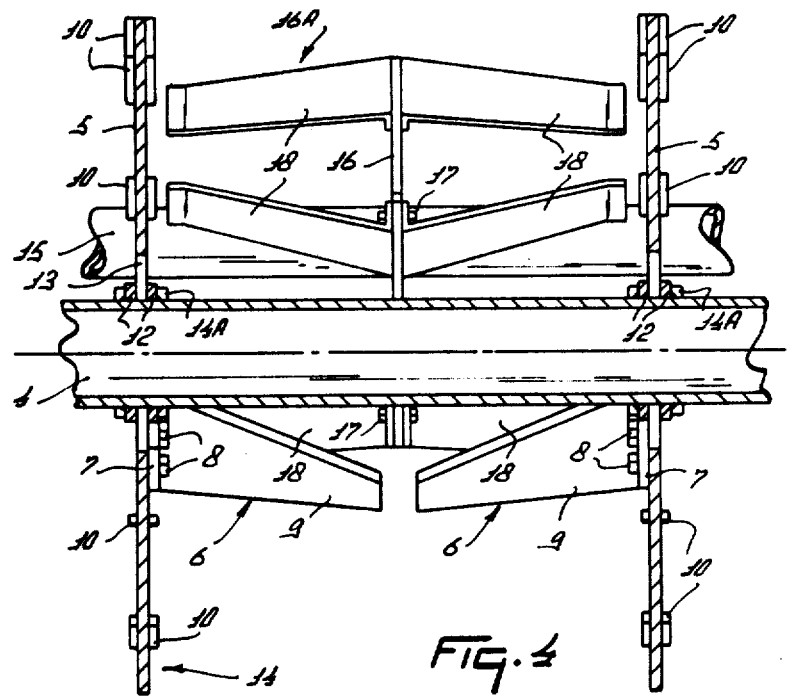
FIG. 4 is a sectional view taken on the line IV—IV in FIG. 3.

FIGS. 1 to 4 show a soil working machine comprising a substantially horizontal frame beam 1, extending transversely of the intended direction of operative travel A of the machine. Upright plates 2 and 3 extend rearwardly away from the frame beam 1; they are fastened to the ends of the frame beam 1. The shape of the plates 2 and 3, which is generally triangular, is shown in FIG. 2. Near the lower edge of each of the plates 2 and 3, at the level of a central area between the plates, extends a carrier 4 which is parallel to the frame beam 1 and is journalled in the plates 2 and 3 by means of stub shafts and bearings. At a distance from its ends, the carrier 4 is provided with five regularly spaced, support discs 5, which are substantially perpendicular to the longitudinal centerline of the carrier. Each of the support discs 5 is provided, on its side or sides facing another disc, with blades 6. Thus, between each pair of discs 5 there are oppositely directed blades 6. The blades 6 between each two discs are arranged in three pairs regularly spaced apart. The blades in the gap between one pair of discs 5 are angularly offset from the blades in the adjacent gap, so that, overall, the blades are arranged helically along the carrier 4. Each of the blades 6 is secured to its disc 5 by means of a triangular fastening part 7 and three bolts 8. The fastening part 7 of each blade 6 is perpendicular to the operative part 9 of the blade. The operative part 9 tapers from its disc to its free end, and is slightly inclined away from the axis of the carrier towards its free end (see FIG. 4). The free ends of the blades 6 extend almost to the middle of the gap between adjacent discs so that a comparatively small space is left between adjacent free ends (FIG. 1). From FIG. 3 it will be appreciated that the blades 6 are disposed so that the operative parts 9 are spaced apart from the carrier 4 by a distance which is substantially equal to the radius of a disc 5. The operative parts 9 of the blades 6 of each pair are provided at the front edge, with respect to the direction of operative rotation, with a straight cutting edge, which is inclined rearwardly with respect to the direction of rotation and which is at an angle of about 20° to the rear edge of the blade, which is parallel to the carrier. At the circumference the discs 5 have serrations formed by regularly distant, identical recesses. The recesses are bounded by one short and one long side, these sides being at an angle of about 120° to one another (FIG. 3). The length of the longer side is about three times that of the shorter side. Each blade 6 is arranged by the longer side of a recess and there is a blade at every fourth recess. The shorter side of each recess is provided with a chissel-like element or cutter 10, secured by two bolts 11. Each cutter 10 has a length corresponding with the length of the shorter side of the recess. The cutters 10 project to each side beyond the disc 5 for a distance which is substantially equal to the thickness of the support (FIG. 4). The discs 5 are fastened to the carrier by pairs of square fastening plates 12 arranged on the carrier 4 and having a size slightly smaller than that of a square recess 13 provided contrally in each disc. Each of the discs 5 is fastened between the plates 12 of each pair by bolts 14A at the corners of the plates 12. This fastening mode permits rapid assembly and disassembly. The carrier 4 with the supports 5, the blades 6 and the cutters 10 constitutes a working member 14 operating as a digging member. Towards the rear of the plates 2 and 3 there is a carrier 15 which extends parallel to the frame beam 1 and the carrier 4. The carrier 15 is rotatably arranged between the plates at a higher level (see FIG. 2) than the carrier 4. At positions midway between adjacent discs 5, there are rotors 16 which have three arms and are fastened to the carrier 15. The arms of rotor 16 extend to the rear with respect to the direction of operative rotation of the carrier 15. Each arm has a long side and a short side, which converge in the direction towards the free end of the arm (FIG. 3). The short side of one arm meets the long side of an adjacent arm. The length of the shorter side of each arm is about half the length of the longer side. At the ends of each arm, on both sides, there are scraping elements in the form of vanes 18 which extend laterally from the arm and are inclined rearwardly with respect to the direction of rotation of the carrier 15. The vanes 18 are fastened to the arms by bolts 17 and extend to near the discs 5. Near their free ends, the scraping vanes 18 are bent over forwardly with respect to the direction of rotation of the carrier 15 (FIG. 4). The carrier 15 with the rotors 16 and the scraping elements 18 constitutes a rotatable scraping member 16A. On the same side of the machine as the plate 3, a stub shaft 19 supporting the carrier 4 of the working member 14 and a stub shaft 20 supporting the carrier 15 of the scraping member 16A extend through the plate 3 into a cover 21A arranged on the outer side of the plate. Inside the cover 21A, each of the stub shafts 19 and 20 is provided with a spur pinion 21; the two pinions 2 are identical. Between the pinions 21 on the stub shafts 19 and 20 there is a shaft 32 with a further pinion 21. The gear train comprising the pinions 21 causes the working member 14 and the scraping member 16A to rotate, in operation, in the same sense and with the same speed. The pinion 21 on the stub shaft 19 of the carrier 4 of the working member 14 is in mesh with one of two further pinions 21, the rotary axes of which lie with the rotary axis of the working member 14 in a common plane a which is inclined downwardly from front to rear. The plane a is at an angle to a plane b containing the rotary axes of the working member 14 and the scraping member 16A. A shaft 23 carrying the upper pinion 21 also carries a pinion 24 which is part of a change-speed gear 25, located near the top of the cover 21A. The pinion 24 is adapted to co-operate with a further pinion 26 on a shaft 27 extending transversely of the direction of movement A to the central region of the machine. The shaft 27 is housed in tube 28 fastened to the plate 3, the end of this tube near the center of the machine being connected with a gear box 29. The gear box 29 is supported by the frame beam 1. Inside the gear box 29, the shaft 27 is drivably connected through a bevel pinion transmission (not shown) with a shaft 30 which projects from the front of the gear box and is connectible through an auxiliary shaft with the power take-off shaft of a tractor. Supports in the form of cage wheels 32 are arranged at positions between the carrier 4 of the working member 14 and the carrier 15 of the scraping member 16A on the outer sides of the plates 2 and 3. They are carried by stub shafts 31 located at a higher vertical level than the carrier 4 of the working member. Each cage wheel 32 is provided with a disc 33, the periphery of which has a rim carrying regularly spaced ribs 34. Although this is not shown, vertical adjustability may be provided for each of the wheels 32 to set the working depth of the working member 14. At equal distances from the center, the frame beam 1 is provided with pairs of tags 35, between which the lower arms of the lifting device of the tractor can be arranged. The frame beam is furthermore provided on the top with upwardly converging supports 36. Between the top ends of these supports 36, the upper arm of the three-point lifting device of the tractor can be arranged.

During operation, the machine is hitched by means of the tags 35 and the supports 36 to the three-point lifting device of a tractor and the working member 14 forming a digging member and the scraping member 16A are driven from the power take-off shaft of the tractor through the transmission described above. As stated above, the working member 14 and the scraping member 16A rotate at the same speed and in the same direction. During rotation of the working member 14, the pairs of relatively co-operating, laterally directed blades 6 slice out clods of earth between cuts made by the cutters 10 arranged on the discs 5 between the blades 6. The clod of earth cut loose during the movement of the blades 6 of each co-operating pair through the ground is fed to the rear and raised until it is taken off the blades 6 by the vanes 18 of the scraping member 16A. It is then deposited upside down in the furrow just made. During operation the vanes 18 for each pair of blades 6 describe a path which overlaps, as viewed from the side (FIG. 3), the path described by the blades 6 of the working member 14. Where the vanes 18 are nearest the carrier 4 they move in the opposite direction to that of the blades 6 along their inner surfaces to detach the cut clod of earth. Owing to the specific disposition of the vanes 18, the clods are forced rearwardly, so that the machine can operate more quickly without the risk of incomplete inversion of the clods of earth.

The co-operation of the working member 14 with the working member 16A constructed in the form of a scraping member ensures an effective inversion of the clods, while a layer of growth, if any, is deposited right at the bottom of the furrow. Since the blades 6 on the respective discs 5 of the working member 14 describe a path having a diameter which is substantially equal to the diameter of the disc 5, so that they do not significantly project beyond the circumference of the disc, the blade is effectively protected, while the disc can ride over any obstacles in the ground. The serrations located between the blades and the cutters 10, form a cut in the soil before the blade 6 comes into contact with the ground, so that loosening of the clod of earth can take place without any trouble. The two upper pinions 24 and 26 located on horizontal, transverse shaft on the side of the machine to form the change-speed gear 25 are replaceable so that the speed of the working member 14 and the speed of the scraping member 16A can be varied to suit the kind of soil and the desired treatment.

Since the exchangeable pinions are located in the upper region of the cover 21A, lubricating oil contained in the cover cannot flow away when the pinions are exchanged. The oil contained in the lower region of the cover is carried upwards by the pinions 21 during operation so that the pinions in the upper part of the screening box are satisfactorily lubricated.

Figure 6:
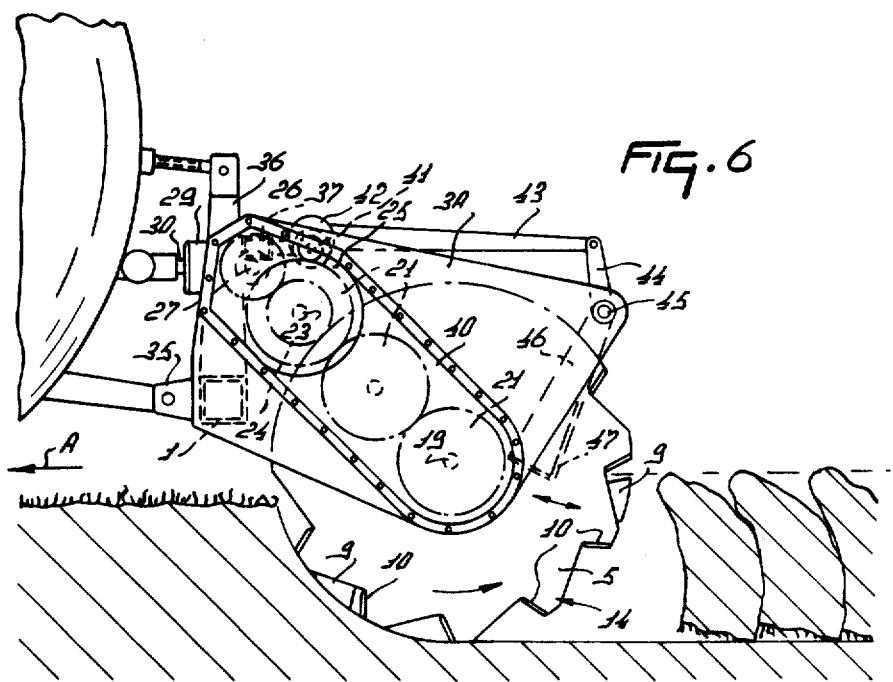
FIG. 6 is a side view taken in the direction of the arrow VI in FIG. 5.
Figure 5:
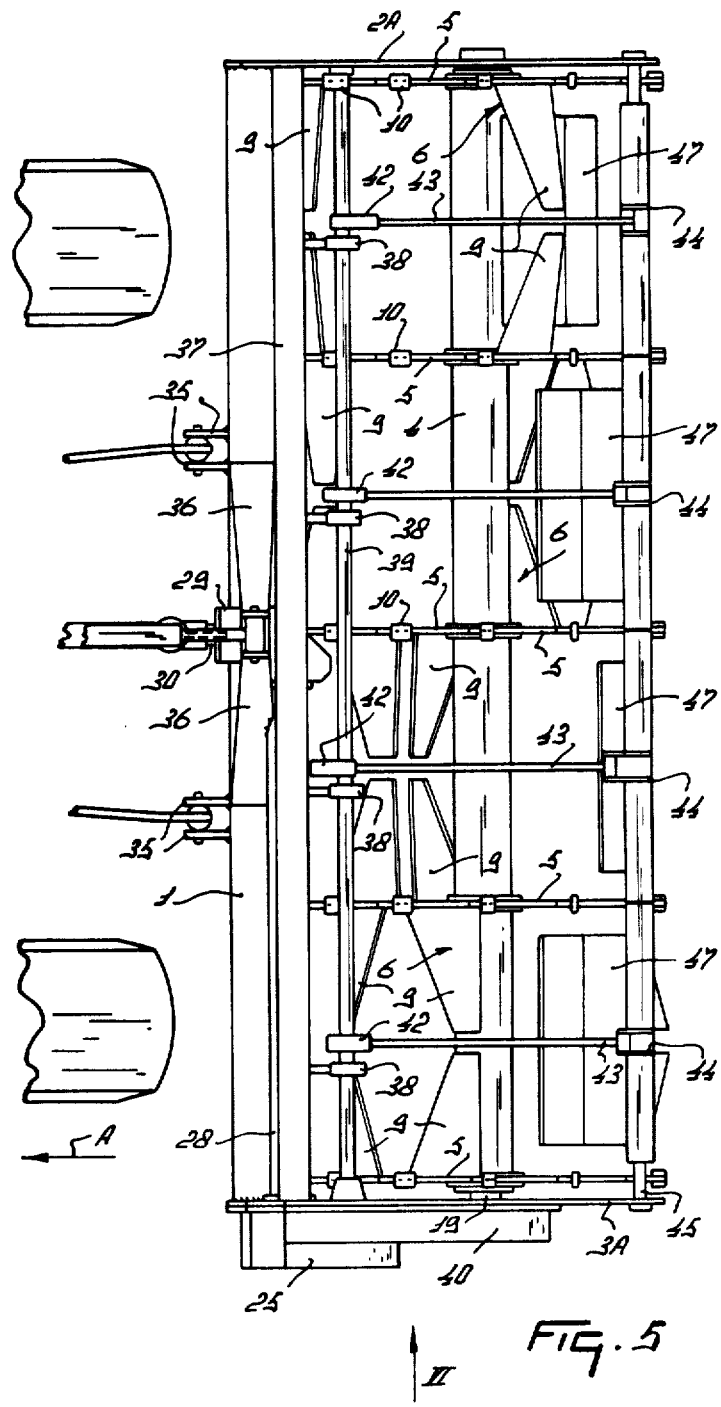
FIG. 5 is a plan view of a second embodiment of a soil working machine.

The embodiment shown in FIGS. 5 and 6 corresponds largely, with the exception of the scraping member, with the preceding embodiment. The machine shown in FIGS. 5 and 6 is provided with shorter side plates 2A and 3A, between which is arranged the working member 14, which is constructed in the form of a digging member in the same manner as in the preceding embodiment; the various parts are designated by the same reference numerals. Near the top side of the planes 2A and 3A there is a frame beam 37 which extends parallel to the frame beam 1 and is provided at regularly spaced intervals with bearings 38 receiving a shaft 39 which extends parallel to the frame beam 37. The shaft 39 is also journalled to the plates 2A and 3A and extends into a cover 40, inside which it is drivably connected through a pinion 41 with the upper pinion 21 of the drive chain to the working member 14. Approximately midway between adjacent pairs of discs 5, the shaft 39 is provided with eccentric mechanisms 42 (FIG. 5). Each eccentric mechanism 42 has a rearwardly extending arm 43, which is pivotally arranged between two supports 44 on a shaft 45 located towards the rear of the machine between the plates 2A and 3A. The shaft 45 carries a downwardly and forwardly inclined carrier 46, which is located midway between adjacent discs 5 and extends near to the carrier 4 of the working member 14. Each carrier 46 is provided with a scraping element 47 which extends to both sides of the carrier 46. From FIG. 6 it will be appreciated that the scraping element 47 is formed from sheet material and has an upwardly extending part terminating at the bottom in a forwardly directed part. The width of each scraping element 47 is such that the lateral edges are located near the disc 5 of the blades 6. During operation the scraping elements 47 are caused to reciprocate by the eccentric mechanisms 42; the frequency of this reciprocatory movement corresponds to the number of pairs of blades 6. When the clod of earth carried by a pair of blades 6 is detached from the soil, the two parts of the scraping elements, which are substantially at right angles to one another, displace the clod to the rear and topple it over, the scraping elements moving closely along the surface of the upwardly moving blades before returning to the front.

Figure 7:
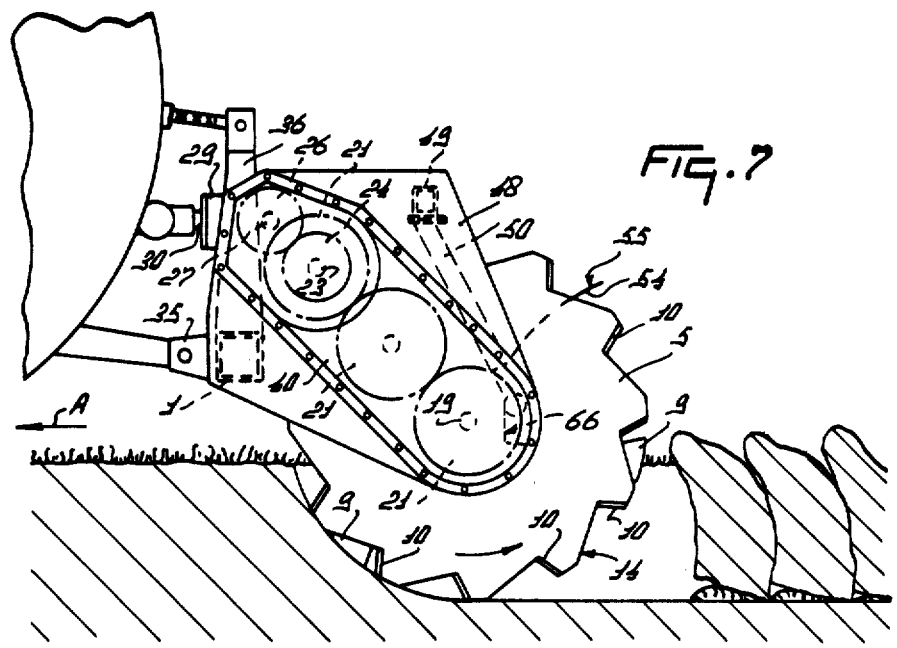
FIG. 7 is a side view of a third embodiment of a soil working machine.
Figure 8:
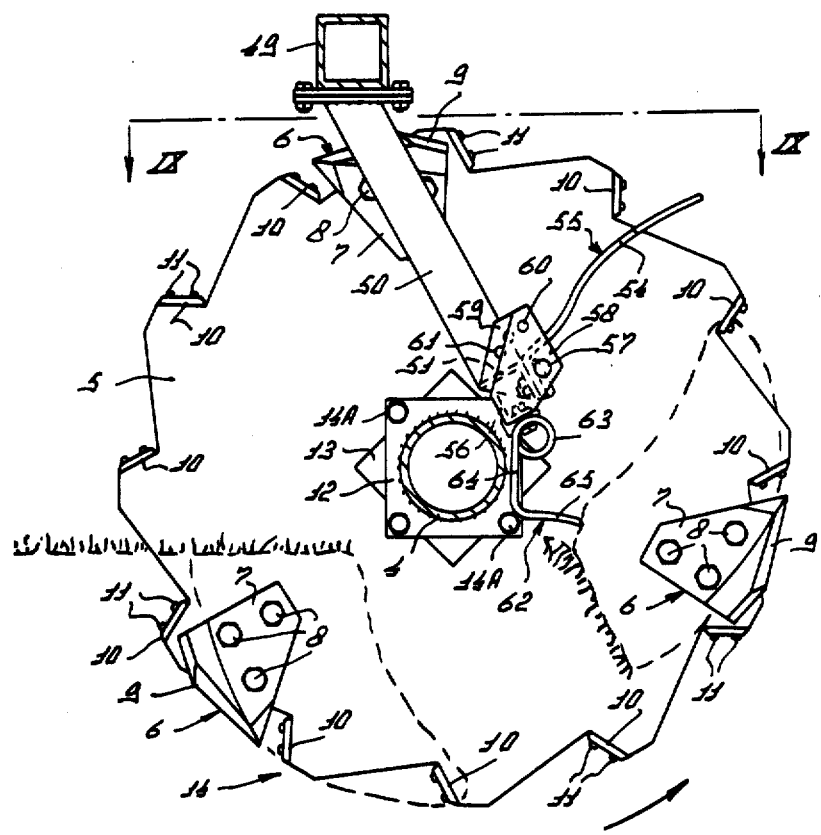
FIG. 8 is an enlarged view of the machine of FIG. 7, corresponding with the view of FIG. 3.
Figure 9:
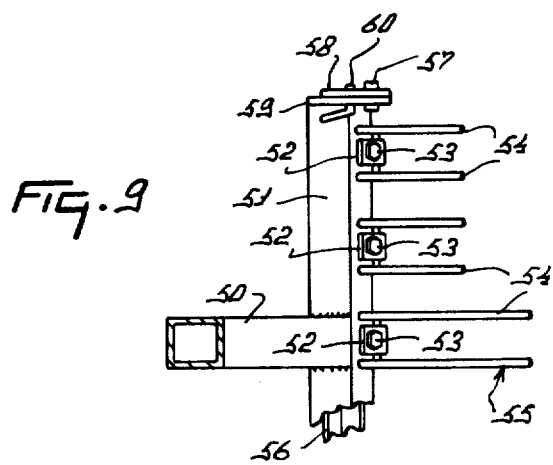
FIG. 9 is a view taken on the line IX—IX in FIG. 8.

The embodiment shown in FIGS. 7 to 9 corresponds largely with the preceding embodiments with respect to the frame and the working member 14, and corresponding components are designated by the same reference numerals. Near the top, at the rear between the plates 48 secured to the frame beam 1, there is a beam 49 which extends parallel to the frame beam 1 just beyond the path described by the blades 6 of the working member 14. At the level of the gap between adjacent blades 6 of each pair, the beam 49 is provided with downwardly and rearwardly inclined supports 50. Each of the supports 50 has at its lower end a carrier 51 which extends parallel to the carier 4 of the working member 14. The carrier 51 extending to near the discs 5 is formed by an angle-iron, one limb of which is in line with the rear side of the support 50. By means of packing pieces 52 and bolts 53 the carrier 51 has fastened to it pairs of scraping elements 54 in the form of tines which are made integrally from spring steel. As shown in FIGS. 7 and 8, these scraping elements 54 curve upwardly for a distance from their fastening areas, after which they curve regularly rearwardly. The two scraping elements 54 nearest the support 50 have a greater length than the others such that they extend between and beyond the adjacent blades 6. The carriers 51 located between the discs 5 of the working member 14 with the scraping members 54 arranged on them constitute together a scraping member 55. Beneath each carrier 51 there is a carrier 56, which also comprises an angle-iron, the limbs of which are directed towards the carrier 51. Each carrier 56 is connected to tags 58 and is pivotally supported by a stub shaft 57 in tags 59. The carrier 56 can be fixed in position by a pin 60, which can be inserted into any one of three holes 61 in the tags 59. At the level of the fastening areas of the scraping elements 54, each carrier 56 is provided with pairs of retainers 62 which are made integrally from spring steel. Each retainer 62 is constructed in the form of a tine and has a coil 63 adjacent its fastening area, this coil adjoining a portion 64 extending substantially straight downwards in direct proximity of the carrier 4 of the working member 14. The portion 64 ends at a substantially rectangular bend which connects it to a substantially horizontal, rearwardly extending portion 65, which curves slightly downwards at its free end (FIG. 8). In this embodiment, as in the two preceding embodiments, a clod of earth is sliced out by two relatively co-operating blades 6 and carried towards the rear. During upward displacement of the cut clod a portion, which was the upper layer of the clod and which may comprise growing matter, in scraped off, by the retainers 62, as is shown in FIG. 8, from the side of the clod facing the shaft. After this, during further turning of the blades, the clod is engaged by the resilient scraping elements 54 of the scraping member 55 which wipe the clod off the blades 6 so that it falls on the growth which was scraped by the retainers 62. Any growth is therefore completely covered. The position of the carrier 56 for the retainers 62 can be varied by turning the carrier about the stub shaft 57 so that the size of the clod portion to be retained can be chosen. This adjustment also serves to match the position of the retainers to the size of the cut clod and hence to the working depth of the machine. Although not shown, the machines illustrated in FIGS. 5 to 9 may also be provided with supporting wheels like the wheels 32 in FIG. 1.

Figure 11:
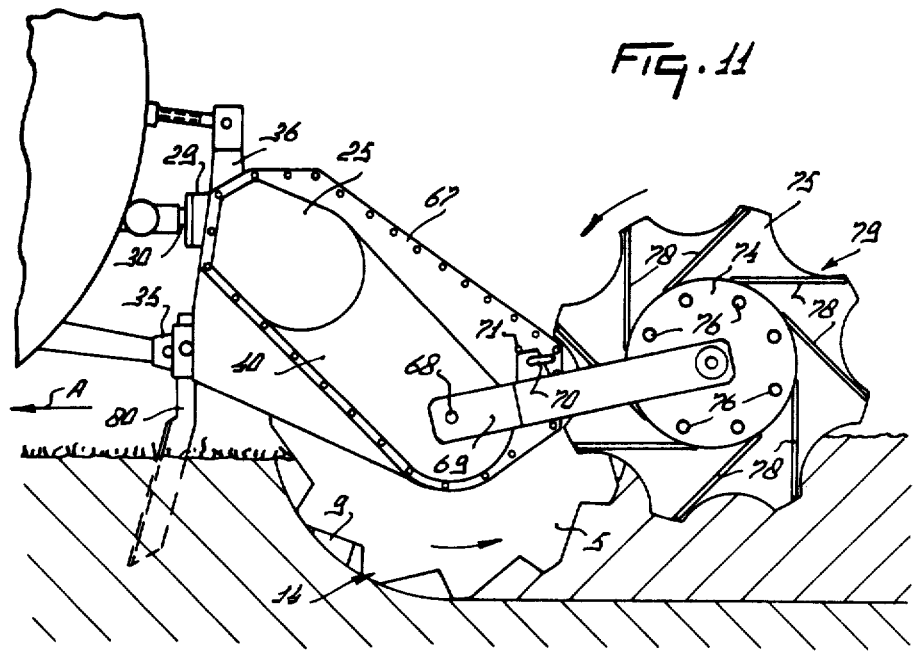
FIG. 11 is a side view taken in the direction of the arrow XI in FIG. 10.

In the embodiment shown in FIGS. 10 and 11, a carrier 4 of a working member 14 is rotatably arranged on the rear side between two plates 67 disposed on the frame beam 1. As in the preceding embodiments, the carrier 4 has secured to it discs 5. However, in this embodiment, the blades 6 of each group between two discs are off-set from one another. On the two sides of the same disc 5, the blades 6 are also off-set from one another (FIG. 10). The blades 6 are arranged so that they are disposed along helical lines running around the carrier 4. In this embodiment, rearwardly extending arms 69 are supported by stub shafts 68 by means of which the carrier 4 is journalled in the plates 67. These arms 69 can be set in any one of a plurality of positions by means of a pin 70 and holes 71 in the plates. The rear ends of the arms 69 carry a freely rotatable roller which supports the machine on the ground during operation. The roller comprises a central carrier 73, along which support discs 74 and 75 are arranged at regular intervals. The discs 74, which are smaller than the discs 75, are located near the ends of the carrier 73, whereas the discs 75 are positioned between the ends of the carrier 73 and are arranged midway between the discs 5 on the carrier 4 of the working member 14. At the circumference the smaller discs 74 have openings receiving tubular elements 76 extending parallel to the carrier 73, these elements 76 also passing through openings in the discs 75 located at the same distance from the carrier as the openings in the discs 74. The tubular elements 76 are prevented from shifting axially by retaining pins (not shown) co-operating with the outer surfaces of the discs 74 near the ends of the carrier 73. The discs 75 have at the circumference regularly spaced arcuate recesses. Between the recesses, on each side of the discs, non-radial, straight ribs 78 extend from the circumference of the discs in the direction of operative rotation as caused by their ground contact. From FIG. 10 it will be seen that the discs 75 are disposed so that they extend between the paths described by the ends of the blades 6 arranged on the discs 5. The roller with its discs 75, which constitute scraping elements, constitutes a ground-driven scraping member 79. In front of each of the discs 5 of the working member, the frame beam 1 is provided with vertically adjustable coulters 80. During operation the coulters 80 cut furrows, between which the blades 6 cut out a clod of earth and carry it upwards to the rear. The clod of earth is released from the blades by the scraping elements 75 and the ribs 78 on both sides of the discs and is deposited upside down in the furrow just made. Instead of using coulters 80, the chisel-like parts 10 may be employed on the discs 5 of the working member 14. From FIG. 10 it will be appreciated that the tubular elements 76 of the scraping member 79 are disposed so that during operation they describe a path adjacent the path described by the blades 6 of the working member 14 so that these elements may assist in releasing the clod of earth, if necessary. By turning the arms 64 about the shafts 68 the position of the scraping member 79 with respect to the working member 14 can be varied so that the operation of the scraping member will have the maximum effect, while in addition the working depth is adjustable.

The constructions described above provide machines for cutting out clods of earth, which are deposited in the furrow made in a manner such that they will lie side by side substantially upside down. For this purpose they are mainly displaced in the rearward direction with the aid of the scraping elements of the respective scraping members described above so that during operation the machine can be advanced with a comparatively high speed.

Although various features of the machines described and illustrated in the drawings, will be set forth in the following claims as inventive features, the invention is not necessarily limited to these features and may encompass other inventive features have been disclosed individually and in various combinations.

Having thus disclosed my invention, what I claim and secure by Letters Patent of the United States is:

1. A soil working machine comprising a frame and at least one working member rotatably mounted on said frame, driving means connected to rotate said member about a horizontal axis, elongated opposing elements on pairs of supports of said member and a further member being displaceably mounted on said frame to the rear of said working member, said further member comprising a plurality of clod depositing means that project between adjacent elements of the working member, said clod depositing means being movable adjacent surfaces of said elements and co-operating with these elements during operation, said clod depositing means being arranged on arms positioned substantially midway between said supports of the working member, said arms being connected to an eccentric mechanism of the driving means and the respective arms being mounted on a shaft which extends substantially parallel to said axis.

2. A soil working machine as claimed in claim 1 wherein each said working member has three sets of said elongated opposint elements equidistant from said working member's axis of rotation which are separated in locations 120° from each other relative to said axis of rotation.

* * * * *